United States Patent [19]

Kilpinen et al.

[11] Patent Number: 5,539,993
[45] Date of Patent: Jul. 30, 1996

[54] LOCATION SCALE AND OPTICAL READING SENSOR FOR READING THE LOCATION SCALE

[75] Inventors: Antti Kilpinen; Sten Siren, both of Parainen, Finland

[73] Assignee: Partek Cargotec Oy, Parainen, Finland

[21] Appl. No.: 313,180

[22] PCT Filed: Mar. 25, 1994

[86] PCT No.: PCT/FI93/00120

§ 371 Date: Oct. 7, 1994

§ 102(e) Date: Oct. 7, 1994

[87] PCT Pub. No.: WO93/20403

PCT Pub. Date: Oct. 14, 1993

[30] Foreign Application Priority Data

Apr. 7, 1992 [FI] Finland .................................... 921531

[51] Int. Cl.⁶ ............................... G01B 3/02; G01B 11/02
[52] U.S. Cl. ................................. 33/706; 33/707; 33/494; 33/679.1
[58] Field of Search .............................. 33/706, 707, 708, 33/494, 762, 763, 679.1, DIG. 3, 114, 1 PT

[56] References Cited

U.S. PATENT DOCUMENTS

| | | | |
|---|---|---|---|
| 4,701,615 | 10/1987 | Schmitt | 33/706 |
| 4,901,073 | 2/1990 | Kibrick | |
| 5,287,630 | 2/1994 | Geisler | 33/706 |
| 5,301,434 | 4/1994 | Imaizumi | 33/1 PT |

FOREIGN PATENT DOCUMENTS

| | | | |
|---|---|---|---|
| 3818044A1 | 11/1989 | Germany | |
| 3910873A1 | 10/1990 | Germany | |
| 3939147A1 | 4/1991 | Germany | |
| 293190 | 8/1991 | Germany | 33/706 |
| 7811483 | 5/1979 | Netherlands | 33/763 |

OTHER PUBLICATIONS

International Preliminary Examination Report–PCT (7/93).

*Primary Examiner*—Christopher W. Fulton
*Attorney, Agent, or Firm*—Scully, Scott, Murphy & Presser

[57] ABSTRACT

A location scale and an optical reading sensor for reading the location scale. The location scale comprises bars with a first edge and a second edge, wherein either the first edges or the second edges are located at regular intervals to form an incremental scale. To provide both incremental data and absolute data on the same scale, the bars are of at least two different widths, and any n successive bars on the scale form a unique individual code indicating the absolute location of those n bars on the scale.

5 Claims, 2 Drawing Sheets

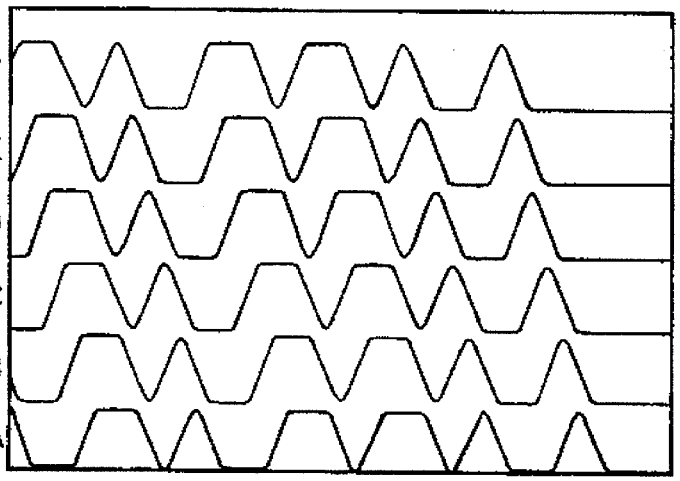
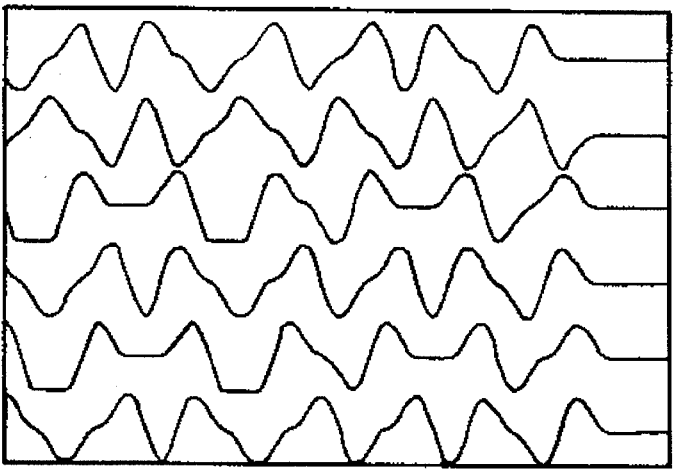
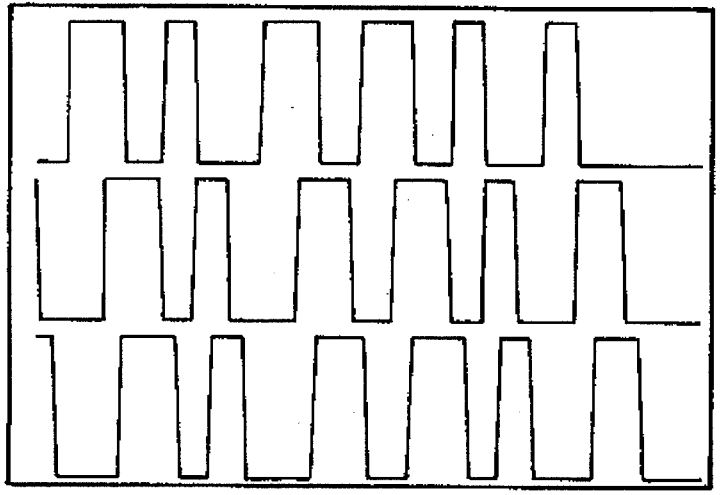

LOCATION SCALE AND OPTICAL READING SENSOR FOR READING THE LOCATION SCALE

BACKGROUND OF THE INVENTION

1. Field of Invention

The present invention relates to a location scale comprising bars with a first edge and a second edge, either the first or the second edges being located at regular intervals. The concepts first edge and second edge refer to edges located closer to and further from the beginning of the scale, respectively. The reading direction of the scale, which can naturally vary, has no effect on the use of these concepts.

The invention also relates to an optical reading sensor for reading such a location scale, comprising several light receivers with different detection areas.

2. Description of the Prior Art

Location scales that are used for tracking and localization of the mutual position of two targets capable of moving with respect to each other consist conventionally of scale bars that are of uniform width and located at regular distances. Such a scale is called an incremental scale. It is read by counting the number of bars starting either from the beginning of the scale or from a separate starting signal located on the scale. The problem that arises with a scale of this kind is that every time the incremental data is lost for some reason, the device must first be driven to the starting signal on the scale before the location data can be restored. In order to avoid this problem, it is known to dispose another scale beside an incremental scale, said other scale comprising absolute codes at regular intervals for indicating the location of the code. Consequently, it is not necessary to return to the beginning of the scale to restore location data when it is lost but only to the nearest absolute code. Such scales are also known wherein the incremental code and absolute codes are mixed with each other in such a manner that a starting signal for an absolute code occurs first on the scale and thereafter the actual absolute code at regular intervals. Such a scale is disclosed, for example, in German Offenlegungsschrift No. 4,818,044. In its use, this code does not differ from the code wherein the incremental scale and the absolute codes are located on different scales in the sense that for restoring the location data, it is always necessary to return to the nearest absolute code.

SUMMARY OF THE INVENTION

The primary object of the present invention is to provide a location scale wherein an incremental scale and absolute codes indicating location are combined in a new way, which enables the restoring of location data after it has been lost by reading only a short portion of the scale over a very short distance. This is achieved with a location scale of the invention, which is characterized in that the scale comprises bars of at least two different widths and that n successive bars on the scale form an individual code indicating the location of said n bars on the scale. The absolute code and the incremental scale are thus completely integrated in such a manner that the first or second bar edges, located at regular intervals, correspond to the bars of the incremental scale. On account of the variation in the width of the bars, an absolute code is also included in the bars in such a manner that a certain number of successive bars, e.g. ten, form an absolute code. To restore absolute location data after it has been lost, it is therefore necessary to read only the number of scale bars corresponding to the number of the code bars. When the given number of bars have been read in the same reading direction, the reading of each new bar creates a new absolute code.

In the simplest version, the scale comprises bars of two different widths, whereby the code is binary.

In order that the reading sensor might have a simple structure, it is preferable that if the distance between those edges of two successive bars that are located at regular intervals is three units of length, the width of the narrower bar is one unit of length, and that of the wider bar is two units of length.

A further object of the invention is an optical reading sensor for reading a location scale as described above. The reading sensor is characterized in that it comprises six light receivers for forming three information signals, the first one indicating those edges of the scale bars that are located at regular intervals, the second one indicating the direction of propagation on the scale, and the third one indicating the width of the scale bars, and that it further comprises a shift register for recording the information about the width of at least n successive scale bars for obtaining an individual code indicating the location of said n bars on the scale.

Most preferably, the total length of the detection area formed by the light receivers in the direction of the scale corresponds to the distance between those edges of two neighbouring scale bars that are located at regular intervals.

BRIEF DESCRIPTION OF THE DRAWINGS

In the following, the location scale of the invention and the optical reading sensor for reading it will be illustrated in greater detail with reference to the accompanying drawings, in which FIG. 4 shows an example of signals from the six light receivers of the sensor of the invention, FIG. 5 shows different combinations of the signals illustrated in FIG. 4, and FIG. 6 shows the three signals formed on the basis of the signals according to FIG. 5, the first one indicating those edges of the scale bars that are located at regular intervals, the second one indicating the direction of propagation on the scale, and the third one indicating the width of the scale bars.

DESCRIPTION OF THE PREFERRED EMBODIMENT

Figure 1:
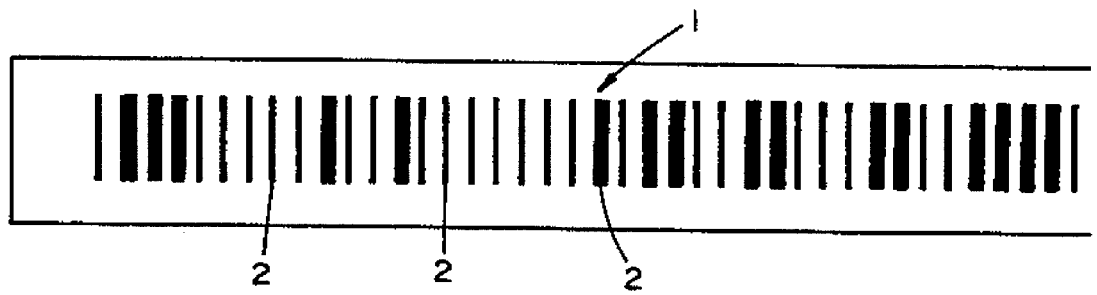
FIG. 1 shows an example of a location scale of the invention.

FIG. 1 shows an example of a bar scale 1 of the invention. This bar scale consists of scale bars 2, the first edges of which, i.e. the left-hand edges in FIG. 1, are located at regular intervals. The bars 2 are of two different widths: in the example of FIG. 1, the widths are one unit of length and two units of length. Accordingly, the distance between the first edges of the bars 2 is three units of length. As the first edges of the bars 2 are located at regular intervals on the scale according to FIG. 1, the scale can be used as an incremental scale. As a result of binary coding of the width of the scale bars, a certain number of successive scale bars, e.g. ten in the case of FIG. 1, form an individual code indicating the location of these bars on the scale. The absolute location on the scale can be found out by reading a number of successive bars corresponding to the length of the code. When the length of an individual code is ten scale bars, the total length of the scale is about 1000 bars, which is sufficient for a scale of about 3 m when the distance between the bars is 3 mm. When the location data has been lost, the absolute location on such a scale can be determined after the scale has been read for a distance of 30 mm. It is also possible to create a longer code by increasing the number of bars used for indicating the location data, whereby the total length of the scale increases correspondingly. In addition to absolute location, the scale also provides incremental data, wherefore it is possible to connect functions pertaining to observation of reading errors and logic necessary for clearing them up with a systems utilizing a location scale of the invention.

Figure 2:
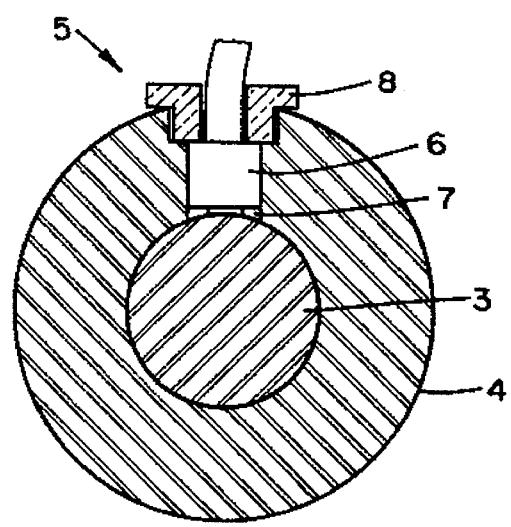
FIG. 2 shows schematically, by way of example, an embodiment of the reading sensor of the invention.

FIG. 2 is a schematic diagram of a situation where a scale according to FIG. 1 is disposed on the piston-rod 3 of a hydraulic cylinder. An optical reading sensor 5 of reflection type is inserted in an end portion 4 of said hydraulic cylinder for reading said scale. The reading sensor 5 comprises an actual read head 6, which is disposed in the immediate vicinity of the piston-rod 3 by means of a spacing plate 7 made of teflon, for example. The read head 6 is supported on the boring in the end portion 4 by means of a locknut 8. The read head 6 comprises six light receivers and a light source or light sources for illuminating the scale. The light receivers may be light sensors each of which focuses the light from a given detection area to a given photo-sensitive component by means of separate lenses, or they may consist of fiber ends of a bundle of fibers, which receive light from a given detection area. When optical fibers are used, the illumination of the scale can be effected by disposing light-emitting fiber ends among the light-receiving fiber ends.

Figure 3:
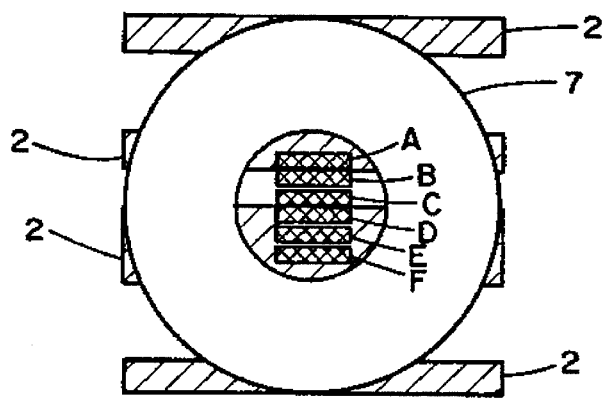
FIG. 3 shows the position of the detection areas of the light receivers.

FIG. 3 shows the area of the piston-rod 3 which can be read by means of the reading sensor according to FIG. 2. Detection areas A, B, C, D, E and F of the optical reading sensor are visible in the middle of the spacing plate 7. As is evident from FIG. 3, the total length of the detection area formed by said detection areas A, B, C, D, E and F in the direction of the scale 1 corresponds to the distance between the first edges of two neighbouring scale bars 2.

FIG. 4 illustrates the signals received by the reading sensor according to FIG. 3 from detection areas A, B, C, D, E and F. It can be seen from FIG. 4 that the signals are identical but have a phase-difference of 60° with respect to each other.

FIG. 5 shows a situation where the signals according to FIG. 4 have been treated by combining them so as to produce difference signals A–C, A–E, B–D, B–F, D–B and D–F. When these signals are combined in pairs in such a manner that the signals A–C and A–E are combined, the clock signal shown lowermost in FIG. 6 is obtained. In said clock signal an ascending change always indicates the first edge of a scale bar. The signal which is in the middle of FIG. 6 and indicates the reading direction on the scale is obtained by combining the signals B–D and B–F. The signal indicating the reading direction can be read either on the ascending or on the descending edges of the clock signal. When the reading direction remains unchanged, the state of the signal indicating the reading direction also remains unchanged during the reading. The signal indicating the reading direction can naturally also be read when the clock signal changes, wherefore the state of the signal becomes alternating in so far as the reading direction on the scale remains unchanged. The data signal which is shown uppermost in FIG. 6 and indicates the widths of the scale bars is obtained by combining the signals D–B and D–F illustrated in FIG. 5. This signal can be read whenever the clock signal changes, whereby the lower state of the signal indicates a narrow scale bar, and the upper state of the signal indicates a wide scale bar.

The reading sensor of the invention also comprises a shift register, which stores information about the width of a specified number of scale bars that have been read. The contents of the shift register disclose thus the absolute code which can be interpreted as absolute location data on the scale. When the reading direction is changed, or if the contents of the shift register are lost for some other reason, the incremental data obtained from the scale must be relied on until the number of scale bars required for the absolute code have been read again.

The location scale of the invention has been described above, by way of example, merely by means of one embodiment. The optical reading sensor, in particular, for reading a scale of this kind represents only a preferred solution as regards the reading principle used by it. Thus, the location scale of the present invention as defined in the appended claims can differ from the embodiment described with respect to both the number of the bars included in a sequence of bars and the width of the bars in such a manner that there can be bars of more than two widths. Furthermore, even other types of optical reading sensors than the one illustrated in FIGS. 2 to 6 can be used for reading the location scale of the invention.

We claim:

1. A location scale comprising bars, with each bar having a first edge and a second edge, wherein either the first edges or the second edges are located at regular intervals to form an incremental scale, and wherein said bars have at least two different widths and any n successive bars on the location scale form a unique individual code indicating the absolute location of said n bars on the location scale.

2. A location scale according to claim 1, wherein said bars are of two widths, with wider width bars and narrower width bars, and said code is a binary code.

3. A location scale according to claim 2, wherein the distance between those edges of two successive bars that are located at regular intervals is three units of length, the width of each narrower bar is one unit of length, and the width of the each wider bar is two units of length.

4. An optical reading sensor for reading a location scale as claimed in claim 1 or 2 or 3, said sensor comprising six light receivers with different detection areas for forming first, second and third information signals, the first information signal indicating those edges of the location scale bars which are located at regular intervals, the second information signal indicating the direction of propagation on the location scale, and the third information signal indicating the width of the location scale bars, and a shift register for recording information about the width of at least n successive location scale bars for obtaining an individual code indicating the absolute location of said n bars on the location scale.

5. An optical reading sensor according to claim 4, wherein the total length of the detection area formed by the light receivers in the direction of the location scale corresponds to the distance between those edges of the location scale bars which are located at regular intervals.

* * * * *

UNITED STATES PATENT AND TRADEMARK OFFICE
CERTIFICATE OF CORRECTION

PATENT NO. : 5,539,993
DATED      : July 30, 1996
INVENTOR(S): Antti Kilpinen, et al.

It is certified that error appears in the above-indentified patent and that said Letters Patent is hereby corrected as shown below:

On the Title Page, item [22]: "Mar. 25, 1994" should read --Mar. 25, 1993--

Column 3, line 15: "systems" should read --system--

Signed and Sealed this

Nineteenth Day of August, 1997

BRUCE LEHMAN

*Attest:*

*Attesting Officer*            Commissioner of Patents and Trademarks